US012794877B2

(12) United States Patent
Viswanathan et al.

(10) Patent No.: US 12,794,877 B2
(45) Date of Patent: Nov. 10, 2026

(54) UNIFIED AND SECURE ACCESS TO DATA SOURCES SERVICING PRIVATE CLOUD WORKLOADS

(71) Applicant: HEWLETT PACKARD ENTERPRISE DEVELOPMENT LP, Spring, TX (US)

(72) Inventors: Swami Viswanathan, Morgan Hill, CA (US); Prakash Mirji, Bangalore (IN); Gaurav Shaha, Maharashtra (IN); Nabin Rana, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 107 days.

(21) Appl. No.: 18/947,627

(22) Filed: Nov. 14, 2024

(65) Prior Publication Data

US 2026/0067268 A1 Mar. 5, 2026

(30) Foreign Application Priority Data

Aug. 30, 2024 (IN) ............................ 202441065736

(51) Int. Cl.
*H04L 9/40* (2022.01)

(52) U.S. Cl.
CPC ........ *H04L 63/083* (2013.01); *H04L 63/0884* (2013.01); *H04L 63/105* (2013.01)

(58) Field of Classification Search
CPC .. H04L 63/083; H04L 63/0884; H04L 63/105
See application file for complete search history.

(56) References Cited

U.S. PATENT DOCUMENTS

| | | | | |
|---|---|---|---|---|
| 10,541,991 | B2 * | 1/2020 | Uhr | H04L 9/0637 |
| 11,196,739 | B2 * | 12/2021 | Kulkarni | H04L 63/0861 |
| 11,811,765 | B1 * | 11/2023 | Debnath | H04L 63/0892 |
| 11,941,643 | B2 * | 3/2024 | Rungta | G06Q 40/03 |
| 12,218,952 | B2 * | 2/2025 | Nambannor Kunnath | H04L 63/20 |
| 12,238,216 | B2 * | 2/2025 | Sathyanarayana | H04L 9/3213 |
| 2018/0048640 | A1 * | 2/2018 | Johansson | H04W 12/068 |
| 2019/0132738 | A1 * | 5/2019 | Zhang | H04W 12/088 |
| 2020/0111200 | A1 * | 4/2020 | Li | G06N 5/046 |
| 2023/0102525 | A1 * | 3/2023 | Nagao | G06F 21/10 705/51 |
| 2023/0342496 | A1 * | 10/2023 | Doshi | G06F 21/6281 |
| 2024/0056443 | A1 * | 2/2024 | Stankoulov | H04L 63/0823 |
| 2024/0406155 | A1 * | 12/2024 | Goel | H04L 63/062 |
| 2025/0015996 | A1 * | 1/2025 | Watanabe | H04L 9/3213 |
| 2025/0202894 | A1 * | 6/2025 | Totale | H04L 63/0815 |

* cited by examiner

*Primary Examiner* — Viral S Lakhia
(74) *Attorney, Agent, or Firm* — Dickinson Wright

(57) ABSTRACT

Systems and methods are provided for a unified and secure data access platform that generates an access token for the user that uniquely identifies the user in the platform. The user may be registered with the platform and associated with an access role, policy/access level, and the access token. The access token may be associated with a data record that is maintained at the policy server containing the information about the user (e.g., access role, policy/access level, etc.). Using the token, the platform can confirm authorization to access multiple points throughout the workload and data access to improve data security throughout the lifecycle.

20 Claims, 9 Drawing Sheets

UNIFIED AND SECURE ACCESS TO DATA SOURCES SERVICING PRIVATE CLOUD WORKLOADS

BACKGROUND

Computing environments store data in diverse formats across various platforms, including structured data in databases like Postgres™, unstructured data in object stores like Amazon™ S3, and file-based data on systems like NFS™ and HPE™ GreenLake™ for Data Storage. This data is often leveraged for data engineering and analytics workloads within a private cloud AI Platform. However, ingesting data from disparate sources presents significant challenges. This includes managing security, developing compatible interfaces, and enforcing consistent access controls across multiple data platforms. Intuitive user interface is also important for Data administrator to create and manage policies.

BRIEF DESCRIPTION OF THE DRAWINGS

The present disclosure, in accordance with one or more various examples, is described in detail with reference to the following figures. The figures are provided for purposes of illustration only and merely depict typical, non-limiting aspects of such examples.

Figure 1:
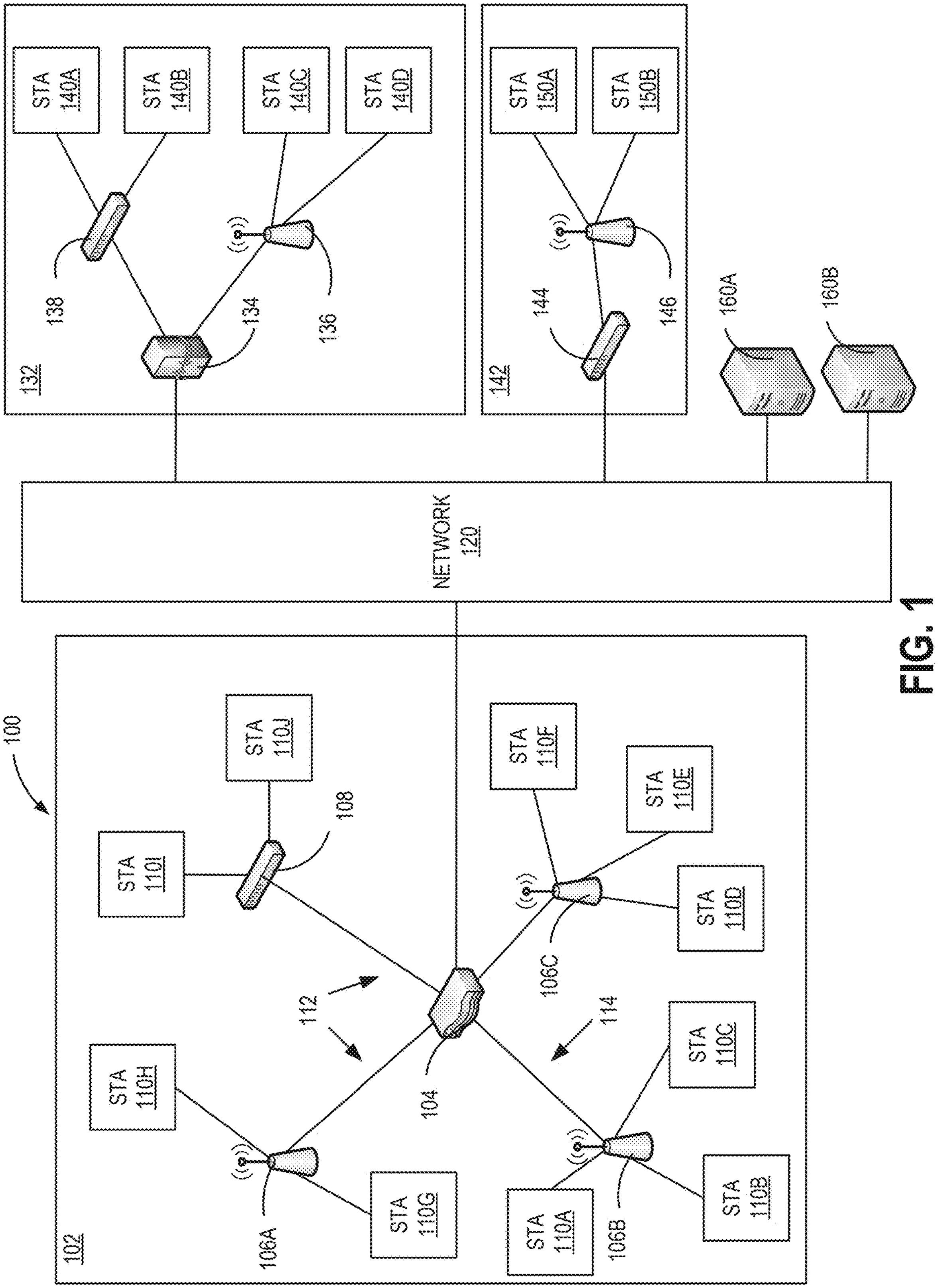
FIG. 1 illustrates one example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

Examples of the disclosure provide a unified and secure data access platform that provides tools for data engineering, data governance, and workload management. For example, the platform can generate an access token for the user that uniquely identifies the user in the platform. The user may be registered with the platform and associated with an access role, policy/access level, and the access token. The access token may be associated with a data record that is maintained at the policy server containing the information about the user (e.g., access role, policy/access level, etc.).

When the user interacts with components of the platform that attempt to access data, the user may provide the access token with these communications to access the workloads and the data. For each of the components, a policy agent is positioned locally to accept the token from the user and determine whether the user is pre-authorized to perform the corresponding task and access the corresponding data. Each policy agent can store and serve the policy information that is pushed from the policy server. The policy agent can authorize access to the data proxy of the external data source or to initiate a workload. When authorized, the workload executes the task and accesses the data stored locally at a data proxy of the external data source. The data is used to perform the task and a response to the workload is returned to user.

The policies may be adjusted/managed by an administrative user via a policy management interface. In some examples, the policy management interface provides an interface for administrative users to access and manage data access policies through the platform. By managing policies centrally within the platform, the administrative users do need not control policies on the remote data sources.

The data proxies may be adjusted/managed by an administrative user via a data source management device. In some examples, a data source management device provides a user interface to access the data proxies for structured and unstructured data. The administrative user can provide information related to the data sources such as credentials, bucket name, files/folder path, database tables, etc. In some examples, the platform can allow/deny access to data based on the policies defined for each user. To support multiple types of data sources, policies can be defined at tabular/columnar level for structured data sources as well as bucket and folder/file level for unstructured data sources.

Technical improvements are illustrated throughout the disclosure. For example, the platform enables multi-layer authentication at several access points, which allow heightened security limitations on the data to help maintain data policy-based controls. Additionally, the components of the platform are interchangeable, so that the customer site can incorporate their own local knowledge base or other data without sharing the component with a public cloud/platform.

Before describing various examples of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. FIG. 1 illustrates an example of a configuration implemented with an organization having multiple users (or at least multiple client devices 110) and possibly multiple physical or geographical sites 102, 132, 142. Network configuration 100 may include primary site 102 in communication with network 120 that stores the platform, including an OpenID Connect (OIDC) provider, set of workloads, authorization policy agents, authorization policy server, and data source proxies, as discussed further herein. Network configuration 100 may also include one or more remote sites 132, 142, each of which may store external data sources that are associated with the data source proxies located at the platform. Each of remote sites 132, 142 may be accessible by the platform that is separately permitted to access the external data.

Primary site 102 may include a primary network, which may be an office network, home network, or other network installation, for example. The primary network may be a private network that includes security and access controls to restrict access to authorized users of the private network. Authorized users may include employees of a company at primary site 102, residents of a house, customers at a business, for example.

In the example of FIG. 1, primary site 102 includes controller 104, which is in communication with network 120. Controller 104 may provide communication with network 120 for primary site 102. There may be other points of communication with network 120 for primary site 102 in addition to controller 104. Although single device associated with controller 104 is illustrated, primary site 102 may include multiple controllers and/or multiple communication points with network 120. In some examples, controller 104 may communicate with network 120 through a router. In other examples, controller 104 provides router functionality to the devices in primary site 102. In this specification, the word "tunnel" refers to an encapsulated mode of transporting data between AP and controller.

Controller 104 may be operable to configure and manage network devices, such as at primary site 102, and may also manage network devices at remote sites 132, 142. Controller 104 may be operable to configure and/or manage switches, routers, access points, and/or client devices connected to a network. Controller 104 may itself be, or provide the functionality of, an Access Point (AP).

Controller 104 may be in communication with one or more switches 108 and/or wireless Access Points (APs) 106*a-c*. Switches 108 and wireless APs 106*a-c* provide network connectivity to various client devices 110*a-j*. Using a connection to switch 108 or AP 106*a-c*, client device 110*a-j* may access network resources, including other devices on the (primary site 102) network and network 120.

Examples of client devices may include: desktop computers, laptop computers, servers, web servers, authentication servers, authentication-authorization-accounting (AAA) servers, domain name system (DNS) servers, dynamic host configuration protocol (DHCP) servers, internet protocol (IP) servers, virtual private network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, internet of things (IOT) devices, and the like.

Within primary site 102, switch 108 is included as one example of a point of access to the network established in primary site 102 for wired client devices 110*i-j*. Client devices 110*i-j* may connect to switch 108 and through switch 108, may be able to access other devices within network configuration 100. Client devices 110*i-j* may also be able to access network 120, through switch 108. Client devices 110*i-j* may communicate with switch 108 over a wired or wireless connection 112. In the illustrated example, switch 108 communicates with controller 104 over a wired or wireless connection 112.

Wireless APs 106*a-c* are included as another example of a point of access to the network established in primary site 102 for client devices 110*a-h*. Each of APs 106*a-c* may be a combination of hardware, software, and/or firmware that is configured to provide wireless network connectivity to wireless client devices 110*a-h*. In the example of FIG. 1, APs 106*a-c* can be managed and configured by controller 104. APs 106*a-c* communicate with controller 104 and the network over connections 112, which may be either wired or wireless interfaces.

Network configuration 100 may include one or more remote sites 132. Remote site 132 may be located in a different physical or geographical location from primary site 102. In some cases, remote site 132 may be in the same geographical location, or possibly the same building, as primary site 102, but lacks a direct connection to the network located within primary site 102. Instead, remote site 132 may utilize a connection over a different network, e.g., network 120. Remote site 132 such as the one illustrated in FIG. 1 may be a satellite office, another floor or suite in a building, for example. Remote site 132 may include gateway device 134 for communicating with network 120. Gateway device 134 may be a router, a digital-to-analog modem, a cable modem, a digital subscriber line (DSL) modem, or some other network device configured to communicate with network 120. Remote site 132 may also include switch 138 and/or AP 136 in communication with gateway device 134 over either wired or wireless connections. Switch 138 and AP 136 provide connectivity to the network for various client devices 140*a-d*.

In various examples, remote site 132 may be in direct communication with primary site 102, such that client devices 140*a-d* at remote site 132 access the network resources at primary site 102 as if these client devices 140*a-d* were located at primary site 102. In such examples, remote site 132 is managed by controller 104 at primary site 102, and controller 104 provides the necessary connectivity, security, and accessibility that enable the connection between remote site 132 and primary site 102. Once connected to primary site 102, remote site 132 may function as a part of a private network provided by primary site 102.

In various examples, network configuration 100 may include one or more smaller remote sites 142, comprising gateway device 144 for communicating with network 120 and wireless AP 146, by which various client devices 150*a-b* access network 120. Examples of remote site 142 may represent, for example, an individual employee's home or a temporary remote office. Remote site 142 may also be in communication with primary site 102, such that client devices 150*a-b* at remote site 142 access network resources at primary site 102 as if these client devices 150*a-b* were located at primary site 102. Remote site 142 may be managed by controller 104 at primary site 102 to make this transparency possible. Once connected to primary site 102, remote site 142 may function as a part of a private network provided by primary site 102.

Network 120 may be a public or private network, such as the Internet, or other communication network to allow connectivity among various sites 102, 132, 142 as well as access to servers 160*a-b*. Network 120 may include third-party telecommunication lines, such as phone lines, broadcast coaxial cable, fiber optic cables, satellite communications, cellular communications, and the like. Network 120 may include any number of intermediate network devices, such as switches, routers, gateways, servers, and/or controllers, which are not directly part of network configuration 100 but that facilitate communication between the various parts of the network configuration 100, and between the network configuration 100 and other network-connected entities. Network 120 may include various servers 160*a-b*. In an example, servers 160*a-b* may comprise content servers that include various providers of multimedia downloadable and/or streaming content, including audio, video, graphical, and/or text content, or any combination thereof. Examples of content servers 160*a-b* include web servers, streaming radio and video providers, and cable and satellite television providers. Client devices 110*a-j*, 140*a-d*, 150*a-b* may request and access the multimedia content provided by content servers 160*a-b*.

In another example, servers 160*a-b* may comprise flow optimization service server that include various information for provisioning services to client devices 110*a-j*, 140*a-d*, 150*a-b* and optimizing traffic flows in accordance with the examples disclosed herein. Access points 106*a-c*, 136, and 146; switches 108; and gateway devices 134 and 144 may request or upload information, such as telemetry data, for optimizing rendering of services to client devices 110*a-j*, 140*a-d*, 150*a-b*. The information may include, but is not limited to, a measure or estimate of QoE on a per traffic flow basis (e.g., referred to herein as a QoE score); flow characteristics and other QoS measurements, such as but not limited to, jitter, delay, airtime, latency, etc.; analytics; transmission protocols (e.g., OFDMA and MU-MIMO), and the like. The information may be stored in a database, which can be communicatively coupled to servers 160*a*, 160*b*. In examples, servers 160*a-b* may be cloud-based, which would be understood by those of ordinary skill in the art to refer to being, e.g., remotely hosted on a system/servers in a network (rather than being hosted on local servers/computers) and remotely accessible.

In some examples, servers 160*a-b* are external data sources that interact with data proxies at primary site 102. The external data sources may comprise structured data sources, object storage, unstructured data storage, external file/directory based storage, and so on.

Figure 2:
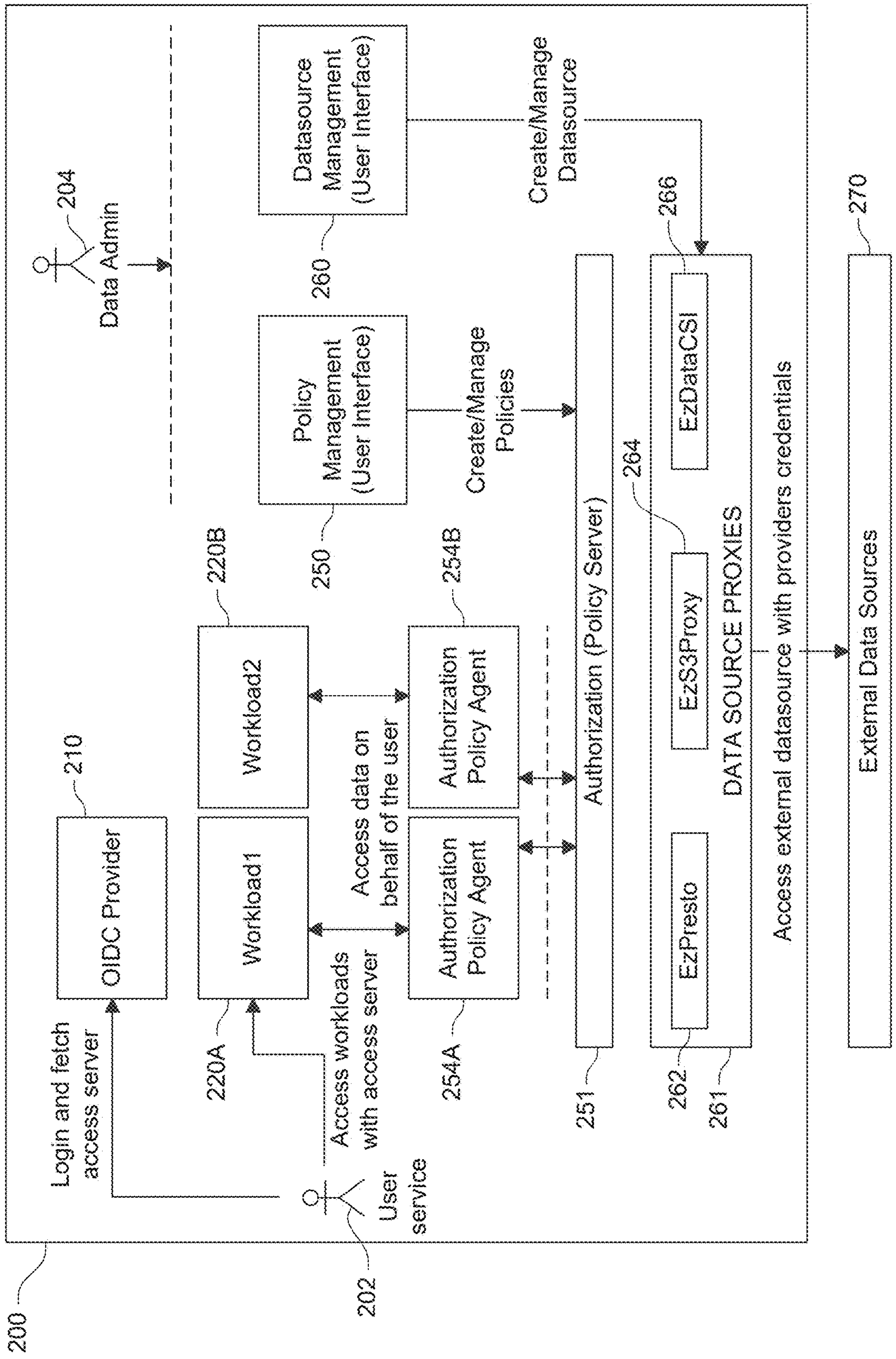
FIG. 2 is an illustrative AI platform with OIDC provider, policy server, and external data sources, in some examples of the disclosure.

FIG. 2 is an illustrative AI platform with OIDC provider, policy server, and external data sources, in some examples of the disclosure. In this example, platform 200 comprises OIDC provider 210, a set of workloads 220, policy management interface 250, policy server 251, policy agents 254, data source management interface 260, a set of data source proxies 261, and external data sources 270.

Platform 200 may comprise data integration, data storage/memory, data security, management, and other features illustrated herein. For example, platform 200 may include an integrated private cloud AI platform that is deployable at a customer site to implement an improved retrieval-augmented generation (RAG) integrated AI platform with chatbot-accessible queries to an large language model (LLM). For example, the AI platform combines a generative LLM with embeddings and vector-based information retrieval to improve the data storage capabilities, information retrieval, security/authentication of the data, and optimize the validity of the response. The AI platform can include components deployed at the customer site that utilize an embedding model that accesses/integrates with various knowledge bases (e.g., locally at the customer site), and permits chatbot-accessible queries to the LLM that utilizes the previously-uploaded embeddings. In some examples, the generative LLM with embeddings and vector-based information retrieval may be accessible upon authentication/authorization by the various components described herein.

OIDC provider 210 is configured to authenticate users and provide identity information to applications. In some examples, OIDC may implement the authentication process through the OpenID Connect protocol that includes an identity layer built on top of the OAuth 2.0 protocol. For example, OIDC provider 210 may prompt the user to log in with their login credentials. Upon successful authentication, OIDC provider 210 issues an access token to the client application. In some examples, the access token contains information about the user, such as their identity (like name and email).

In some examples, OIDC provider 210 may also expose a UserInfo endpoint where client applications can request additional details about the authenticated user. In this example, platform 200 can rely on OIDC provider 210 to confirm an identity of the user that can be used to authenticate the user to the platform.

Workloads 220 may correspond with individual applications that are managed and executed in a cluster. Each workload may perform different types of functions and tasks, including pods, deployments, stateful, StatefulSets, ReplicaSets, DaemonSets, jobs, or CronJobs. Each type of workload 220 can provide different capabilities to handle a variety of application requirements and deployment patterns.

The pod workload is configured to share a network namespace and storage workload with a group of one or more containers. Pods can be used to run single instances of an application or service either directly or managed by higher-level workload controllers.

The deployment workload is configured to manage a set of replica pods at a higher-level abstraction. The deployment workload can identify a specified number of pod replicas and determine whether they are active/running. In some examples, the deployment workload can determine features of the pods and issue updates that manage changes to application versions.

The StatefulSets workload is configured to provide stable, unique network identifiers and persistent storage for applications. In some examples, the StatefulSets workload can provide a guarantee or similar response about the ordering and uniqueness of the containers in the system.

The ReplicaSets workload is configured to determine a number of pod replicas that are executed at a given time and add/remove pods as necessary. The ReplicaSet workload may help ensure that the specified number of pod replicas are running at any given time. In some examples, the ReplicaSets workload may be managed by the deployment workload, which can provide higher-level management and additional features.

The DaemonSets workload is configured to determine that a copy of the pod is running in a cluster. In some examples, the DaemonSets workload may be used for deploying background services like log collectors or monitoring agents that need to run on every node.

The Jobs workload is configured to manage tasks that run to completion. For example, in batch processing or one-time tasks, the jobs workload can manage the tasks that have a defined end. In some examples, the jobs workload can help ensure that a specified number of pods complete successfully before marking the job as complete.

The CronJobs workload is configured to allow jobs to run on a scheduled basis. The scheduling of these jobs may be used for periodic tasks like backups or generating scheduled reports.

Policy management interface 250 is configured to provide an interface to policy server 251. The interface 250 may include dashboards, forms, and wizards to simplify policy creation and management at policy server 251 or application programming interfaces (APIs) for access to other systems and tools (e.g., automation, integration, etc.).

Policy server 251 may define, configure, enforce, and manage security policies and profiles within platform 200 by adding new policies, editing rules, or adjusting settings. Policy management interface 250 enables administrative user 204 to create and control policies that govern the security settings within platform 200.

In some examples, policy server 251 is configured to create new security policies by specifying rules and guidelines that need to be enforced. This includes defining access controls, authentication requirements, encryption standards, and other security measures. In addition to security policies, policy server 251 may create and manage security profiles to group related security policies. The security profiles can apply the security rules consistently across different users and applications.

Policy agents 254 may be deployed throughout platform 200 to implement the policy settings. For example, a first policy agent 254A may be deployed with first data source proxy 261A and second policy agent 254B may be deployed with second data source proxy 261B. In other examples, a first policy agent 254A may be deployed with first workload 220A and second policy agent 254B may be deployed with second workload 220B. Policy agents 254 may apply the policies that are pushed/copied from policy server 251 to identify, manage, and limit access to data and functionality at the set of data source proxies 261 and workloads 220.

In some examples, policy agents 254 include tools for tracking processing performed by workloads 220 and effectiveness of policies. The monitoring may comprise real-time data packet analysis, comparing access to security rules under the profile, and generating alerts when policies are violated. Policy agents 254 may transmit data back to policy server 251 to audit/analyze the application of the policies, including determining when the policies were applied, which are being violated, and the overall effectiveness of security measures.

Data source management interface 260 is configured to provide an interface to data source proxies 261. The interface 260 may allow access to a set of tools, protocols, and APIs that enable the management and interaction with data source proxies 261 within platform 200. Data source proxies 261 are intermediary devices that facilitate the access, manipulation, and security of data stored at external data sources 270. Data source management interface 260 provides a standardized way to handle these interactions.

In some examples, data source proxies 261 manage user access to external data sources 270 to help ensure that only authorized users or systems can perform specific operations. The access may be approved through the use of the access token and corresponding access permissions stored with policy server 251, or other security protocols like OAuth, API keys, or role-based access control (RBAC).

In some examples, data source proxies 261 may extract data or receive extracted data from external data sources 270. The data may be accessible using a query-based protocol via data source management interface 260 accessible by administrative user 204 or a chatbot accessible by user 202.

In some examples, data source proxies 261 are configured to update, insert, or delete data at external data sources 270 through the proxy 261. The data may be copied/propogated through the data systems to help ensure that changes are accurately reflected across the integrated systems.

In some examples, data source proxies 261 are configured using data source management interface 260. The interface 260 allows administrative user 204 to configure settings for the data proxy 261 including connection parameters, data source mappings, and performance tuning.

In some examples, data source proxies 261 are configured to encrypt data in transit and at rest. The encryption may help secure the data being transmitted from external data sources 270 to policy agents 254 that are local to individual workloads 220. The data may be decrypted locally for use by workloads 220 in executing the task for the user.

A set of data source proxies 261 may include presto data proxy 262, S3 data proxy 264, and data CSI data proxy 266. The data proxies 261 may provide intermediary access to external data sources 270 to help improve data security and ensure that the users with the appropriate access rights are accessing the data.

Presto data proxy 262 is configured to access an open-source distributed SQL query engine (e.g., Presto) designed for running interactive analytic queries on large datasets across various data sources. Presto data proxy 262 may implement an intermediary service that facilitates the access and management of data queries through the Presto query engine.

In some examples, presto data proxy 262 directs queries from user 202 to a Presto cluster or coordinator so that the queries are distributed and handled by the available resources. Presto data proxy 262 manages query routing, load balancing, security, and performance optimization while providing a layer of abstraction between user 202 and the Presto cluster.

S3 data proxy 264 is configured to implement an intermediary service that accesses structured external data sources 270, like Amazon™ Simple Storage Service (S3), by managing requests, access, and data operations. S3 data proxy 264 is configured to abstract the direct interaction with external data sources 270, providing additional functionality or integration capabilities.

In some examples, S3 data proxy 264 directs queries from user 202 to the appropriate S3 endpoints so that queries are routed to different regions or buckets of the Amazon™ environment based on specific criteria and avoid exceeding usage quotas.

Data CSI data proxy 266 is configured to implement an intermediary service that accesses structured external data sources 270, like Container Storage Interface (CSI). Data CSI data proxy 266 may interact with containerized applications and storage systems managed through the CSI framework, like Kubernetes™, to manage storage resources consistently across different storage providers.

In some examples, data CSI data proxy 266 directs queries and other storage-related requests from containerized applications to the appropriate CSI drivers. Data CSI data proxy 266 may help route data operations based on needs of workload 220 and the underlying storage system.

In some examples, Data CSI data proxy 266 may also facilitate read and write operations between containerized applications and the storage system. Data CSI data proxy 266 may help translate container storage requests into operations understood by the CSI driver.

Figure 3:
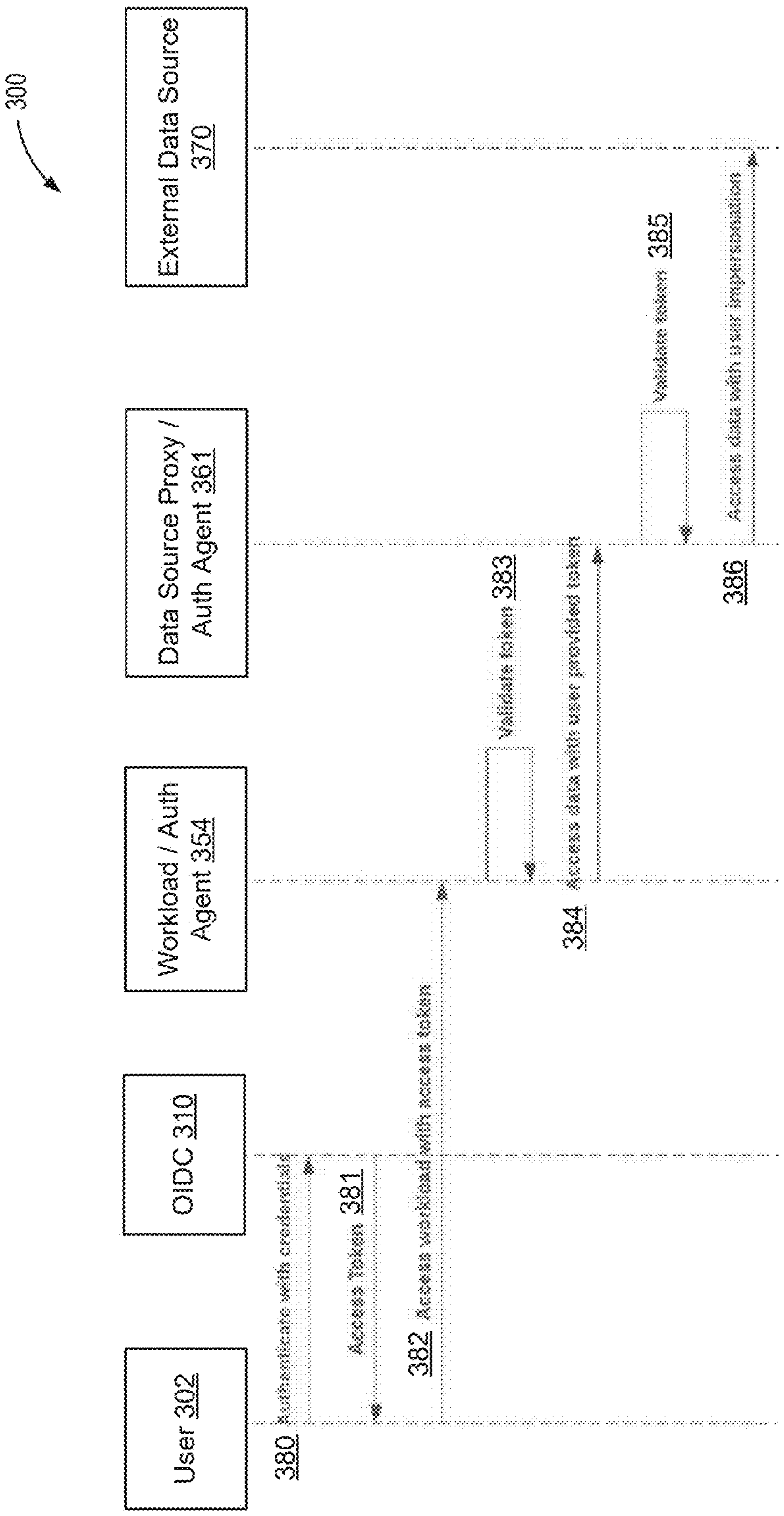
FIG. 3 illustrates a communication process with an access token implemented at the AI platform, in some examples of the disclosure.

FIG. 3 illustrates a communication process with an access token implemented at the AI platform, in some examples of the disclosure. In example 300, user 302, OIDC 310, workload/authorization policy agent 354, data source proxy/authorization policy agent 361, and external data source 370 are illustrated. In some examples, these entities and devices may correspond with user 202, OIDC provider 210, workload 220, authorization policy agent 254, data source proxies 261, and external data source 270 in FIG. 2, respectively.

At block 380, user 302 authenticates with the AI platform using login credentials submitted OIDC provider 310. The login credentials may correspond with a unique identifier (e.g., username and password, biometric data, smart cards, one-time password, security questions and answers, etc.) that allows user 302 to verify their identity and access the AI platform.

At block 381, the platform (via OIDC provider 310) generates an access token for user 302 that uniquely identifies the user in the system. The access token may correspond with a policy/access level for user 302 throughout the platform and the policy may be maintained at policy server. In some examples, when user 302 logs into the system via OIDC provider 310, OIDC provider 310 authenticates the user and generates a new token.

User 302 may be registered with the AI platform and associated with an access role and an access token. The access token may be uniquely associated with the user. The token may be associated with a data record that is maintained at a policy server (shown in FIG. 2 as policy server 251) containing information about user 302, roles, and access rights throughout the system.

The policies may be adjusted/managed by an administrative user at the policy server via policy management interface, as described with FIG. 2. The policy management interface may allow administrative users to access and manage data throughout the AI platform using policies that are stored at the policy server. By managing policies centrally within platform, administrative users may not need to control policies locally on workloads or data sources.

At block 382, user 302 may provide/submit the access token with communications within the AI platform (e.g., to access workloads and data proxies), including an authorization/policy agent that is located locally with workload 354. Each policy agent 354 can store and serve the policy information that is pushed from the policy server. In this example, user 302 submits the token to a workload so that a job or other cloud-based service can be initiated on the user's behalf.

At block 383, policy agent 354 may validate the access token that was submitted from user 302. In some examples, the token may be associated with the workload. In other examples, the same token is used throughout the authentication process and remains unchanged through each submission by user 302. When the token is received, policy agent 354 checks the access role identified with the token in a local data store at the agent, confirming that user 302 is allowed to request the workload and access corresponding data.

At block 384, when authorized, the workload executes the task and accesses the data. For example, the workload associated with policy agent 354 accesses the data via data source proxy 361. Data source proxy 361 may be adjusted/managed by administrative users, and these users may access parameters of the data source proxy via an interface (e.g., data source management interface 260 in FIG. 2). The AI platform can allow/deny access to data based on the policies defined for each user.

In some examples, the data source proxy may include data that is transmitted from external data sources 370 and stored locally in the AI platform at one of the data source proxies 361. In this example, the request for data from workload may access the locally stored data and initiate the workload/job for the user. In some examples, the request to access the data may include the token from user 302 and request to access the data at an external data sourced 370. The process may proceed to block 385.

At block 385, data source proxy/policy agent 361 may validate the token that was submitted from workload/policy agent 354 and authorize user access to the data. To validate and authorize the access, policy agent 361 checks the access role identified with the token in a local data store at the agent, confirming that user 302 is allowed to request the workload and access corresponding data that is stored remotely at external data source 370.

At block 386, when the data request proceeds to external data source 370 (e.g., and the data is not locally copied to data source proxy 361), data source proxy 361 is configured to access data stored at external data source 370. The request for data from data source proxy 361 may access the stored data at external data sources 370, then return the data to workload 354 to initiate the job for the user.

Figure 4:
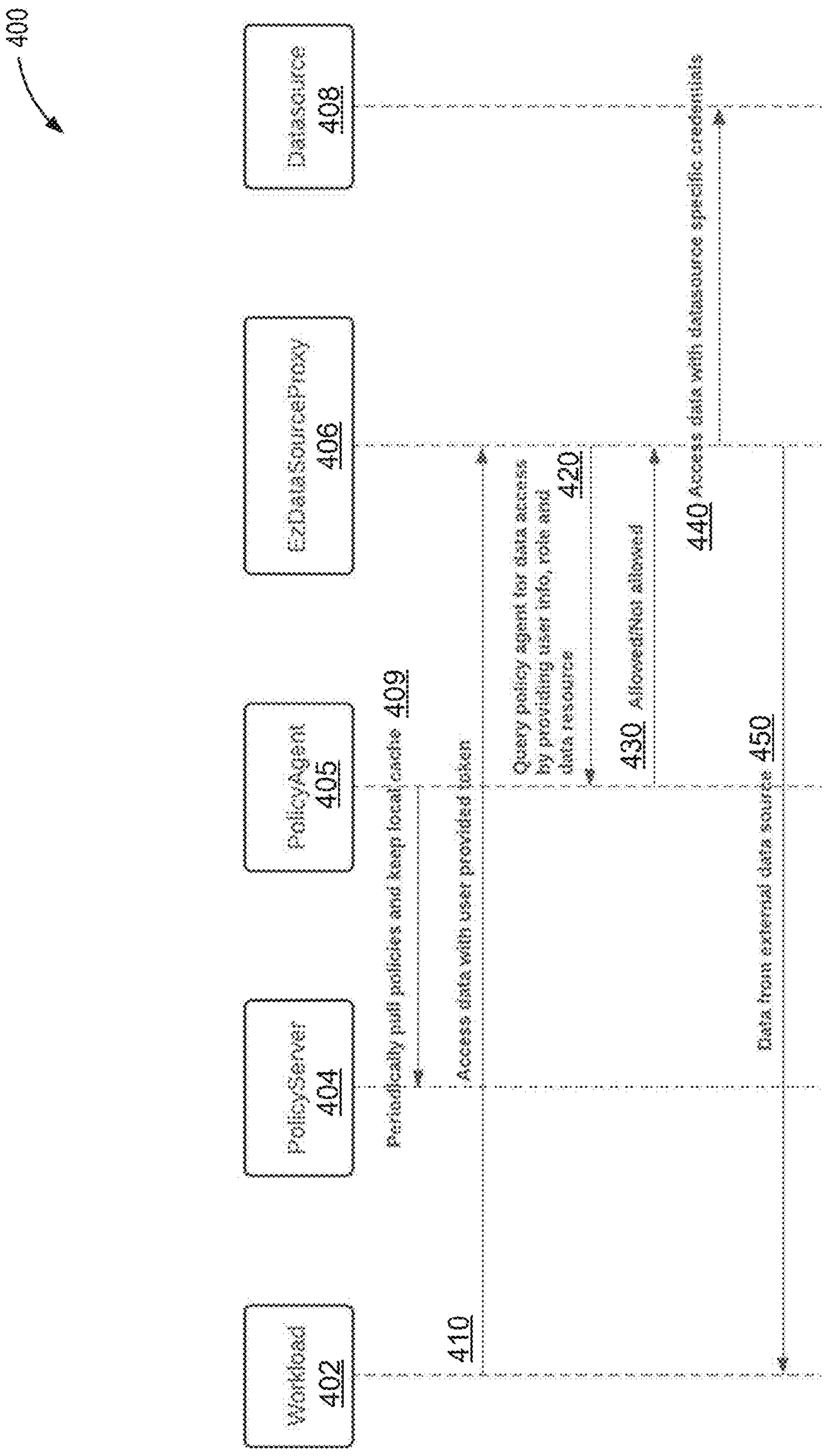
FIG. 4 illustrates a communication process for accessing a data proxy implemented at the AI platform, in some examples of the disclosure.

FIG. 4 illustrates a communication process for accessing a data proxy implemented at the AI platform, in some examples of the disclosure. In example 400, workload 402, policy server 404, policy agent 405, data source proxy 406, and external data source 408 are illustrated. In some examples, these entities and devices may correspond with workload 220, policy server 251, policy agent 254, data source proxy 261, and external data source 270 in FIG. 2, respectively.

At block 409, policy agent 405 automatically and periodically pulls policies from policy server 404. In some examples, policy server 404 may automatically push/transmit the policies to policy agent 405. The policies may define the user's access rights with the platform upon registration with the platform. The policies may be stored locally with policy agent 405 and policy agent 405 may be configured to manage the access to the data and functionalities of data source proxy 406 and workload 402.

At block 410, workload 402 transmits a request message to data source proxy 406. The request message comprises an identification of the data to access and the token from the user.

At block 420, data source proxy 406 transmits a query request to policy agent 405 for data access. The query request may request access from policy agent 405 for the data. The query request may include user information, user role, and the data resource requested. In some examples, the user information and user role are included in the query request using the access token from the user.

The data access may be limited to users that are authorized or authorized systems, where the operations can be limited to perform specific operations. The data access may be approved through the use of the access token and corresponding access permissions stored with policy server 404, or other security protocols like OAuth, API keys, or role-based access control (RBAC).

At block 430, policy agent 405 may transmit a query response to data source proxy 406, identifying whether the access is allowed or not allowed. In some examples, policy agent 405 is positioned locally at the data source proxy 406 to accept the token and determine whether the user is pre-authorized to perform the corresponding task (associated with workload 402) and access the corresponding data. Policy agent 405 can store and serve the policy information that is pushed from policy server 404. When authorized, workload 402 executes the task and accesses the data stored locally at data source proxy 406 of external data source 408. The data is used to perform the task and a response to workload 402 is returned to user.

In some examples, policy agent 405 is positioned locally at workload 402 to accept the token from workload 402 and determine whether the user is pre-authorized to perform the corresponding task and access the corresponding data. When authorized, workload 402 executes the task and accesses the data stored locally at data source proxy 406. The data is used to perform the task and a response to workload 402 is returned to user.

At block 440, when access is allowed, data source proxy 406 transmits a data request to external data source 408 for data access. Data source proxy 406 may locally store credentials that are reused at data source 408, such that any user that is authentication and authorized through the AI platform has access to the reusable credentials that are accepted by data source 408. Data source 408 may transmit the data back to data source proxy 406.

At block 450, data source proxy 406 transmits the data back to workload 402 on behalf of external data source 408. Workload 402 executes the task using the data that was provided by data source proxy 406 and, upon completion of the task, the response is returned to user.

Figure 5:
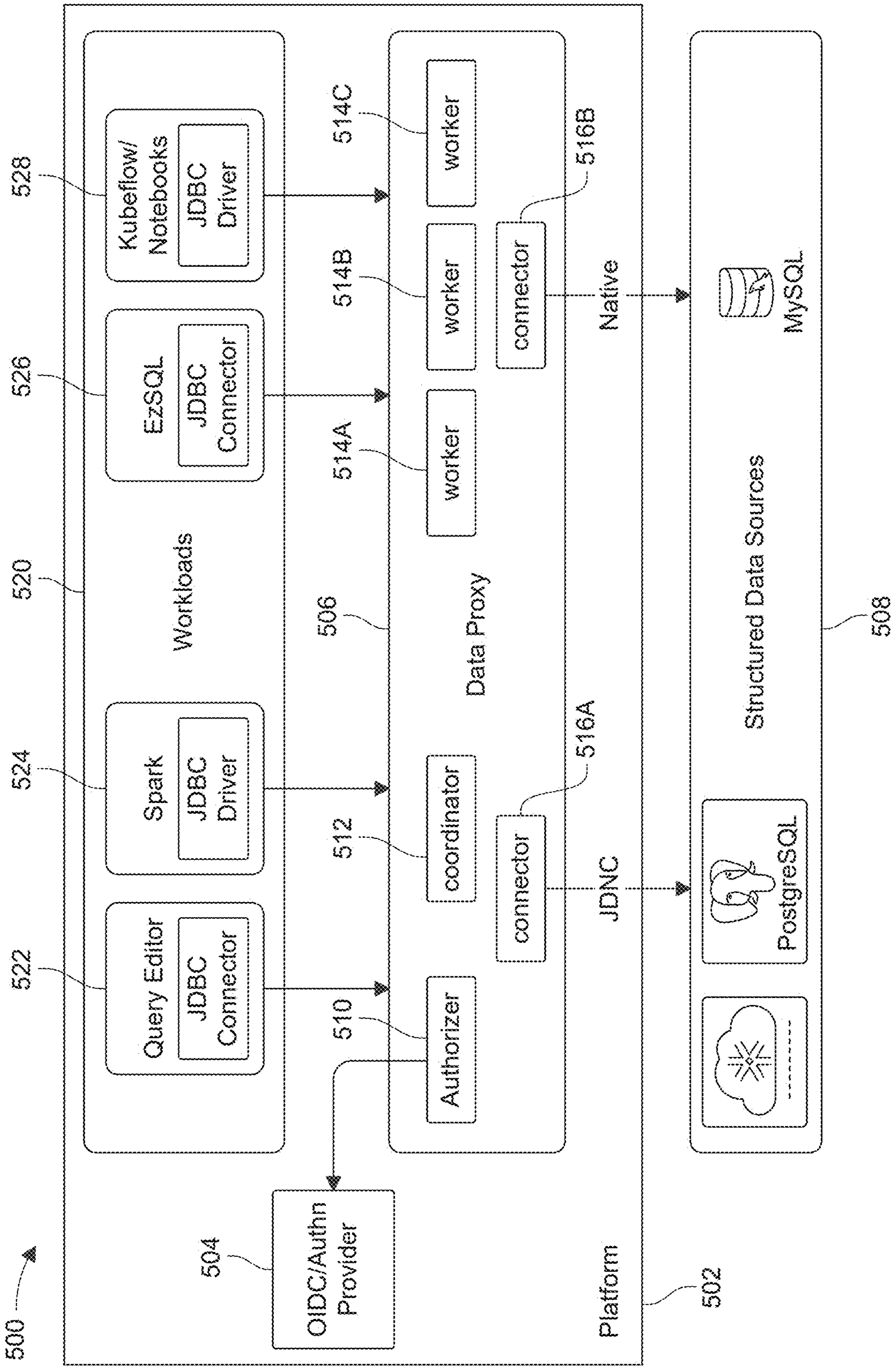
FIG. 5 illustrates accessing a data proxy of a structured data source implemented at the AI platform, in some examples of the disclosure.

FIG. 5 illustrates accessing a data proxy of a structured data source implemented at the AI platform, in some examples of the disclosure. In example 500, data proxy 506 in AI platform 502 provides access to structured data source 508 (e.g., Snowflake™ and Postgres™) after the user has been authenticated to access the particular data. For example, the user may receive the access token from OIDC provider 504 (e.g., based on authentication using login credentials). OIDC provider 504 can provide the access token to data proxy 506 to store locally and compare with an incoming access token at a later time (e.g., when the workload initiates a task/job). Once the token is stored, authorizer 510 at data proxy 506 can authenticate and authorize any data requests associated with the access token based on the policies corresponding to the access token.

In some examples, a secure communication tunnel can be generated between workload 520 and structured data source 508 through data proxy 506 to initiate the communication between workload 520, data proxy 506, and structured data sources 508. The secure communication tunnel may be a protocol aware tunnel based on the type of data being accessed (e.g., the structured data source). AI platform 502 may open the tunnel for initiating a session between structured data source 508 and workload 520. The access token associated with the user may be downloaded and saved to authorizer 510 at data proxy 506.

Workload 520 may comprise various components that are in communication with data proxy 506, including query editor 522, spark 524, SQL 526, Kuberflow/notebooks 528, and other services that can support data processing and other operations initiated by workload 520. Data proxy 506 may comprise components that receive the request from workload 520, including coordinator 512 and one or more workers 514 (illustrated as first worker 514A, second worker 514B, and third worker 514C).

Data proxy 506 may communicate with structured data source 508 via connector 516 (illustrated as first connector 516A second connector 516B). The connection between data proxy 506 and structured data source 508 may correspond with various implementations. For example, data proxy 506 establishes a connection to structured data source 508 using a connection resides in a pool. When a client sends a statement or transaction, data proxy 506 can check out the connection from the pool and use the connection for the duration of the statement or transaction, then break down the connection at the end of the transmission.

Figure 6:
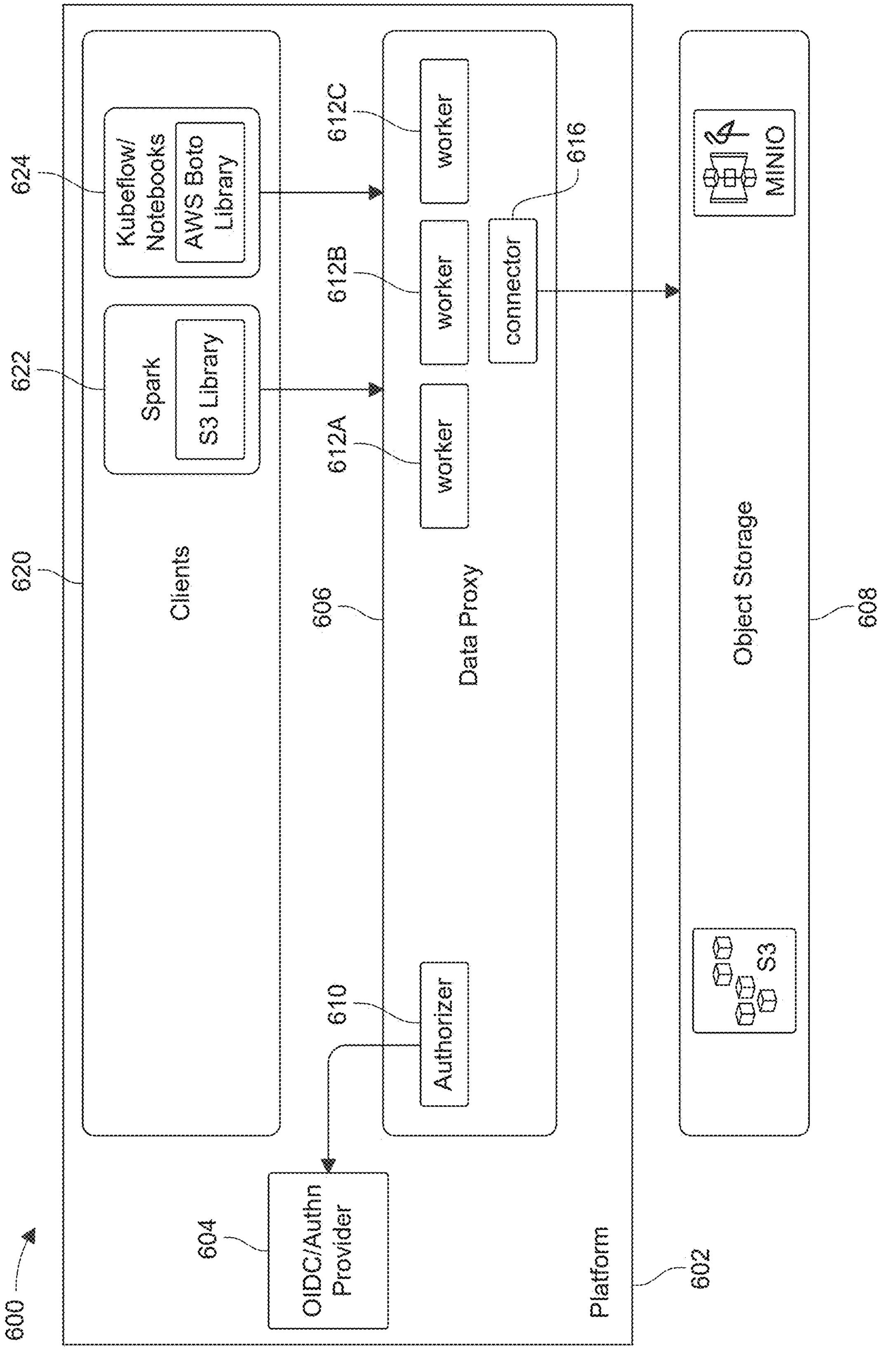
FIG. 6 illustrates accessing a data proxy of an object storage implemented at the AI platform, in some examples of the disclosure.

FIG. 6 illustrates accessing a data proxy of an object storage implemented at the AI platform, in some examples of the disclosure. In example 600, data proxy 606 provides access to object data stores (e.g., MinIO™, Amazon™ S3, Greenlake for File™, and other S3-compliant data sources) after the user has been authenticated to access the particular data. For example, the user may receive the access token from OIDC provider 604 (e.g., based on authentication using login credentials). OIDC provider 604 can provide the access token to data proxy 606 to store locally and compare with an incoming access token at a later time (e.g., when the workload initiates a task/job). Once the token is stored, authorizer 610 at data proxy 606 can authenticate and authorize any data requests associated with the access token based on the policies corresponding to the access token.

In some examples, a secure communication tunnel can be generated between clients 620 and object data stores 608 through data proxy 606 to initiate the communication between clients 620, data proxy 606, and object data stores 608. The secure communication tunnel may be a protocol aware tunnel based on the type of data being accessed (e.g., the object data). AI platform 602 may open the tunnel for initiating a session between object data stores 608 and clients 620. The access token associated with the user may be downloaded and saved to authorizer 610 at data proxy 606.

Clients 620 may comprise various components that are in communication with data proxy 606, including spark 622, Kuberflow™/notebooks 624, and other services that can support data processing and other operations initiated by clients 620. Data proxy 606 may comprise components that receive the request from clients 620, including one or more workers 612 (illustrated as first worker 612A, second worker 612B, and third worker 612C).

Data proxy 606 may communicate with object data stores 608 via connector 616. The connection between data proxy 606 and object data stores 608 may correspond with various implementations. For example, data proxy 606 establishes a connection to object data stores 608 using a connection resides in a pool. When a client sends a statement or transaction, data proxy 606 can check out the connection from the pool and use the connection for the duration of the statement or transaction, then break down the connection at the end of the transmission.

Figure 7:
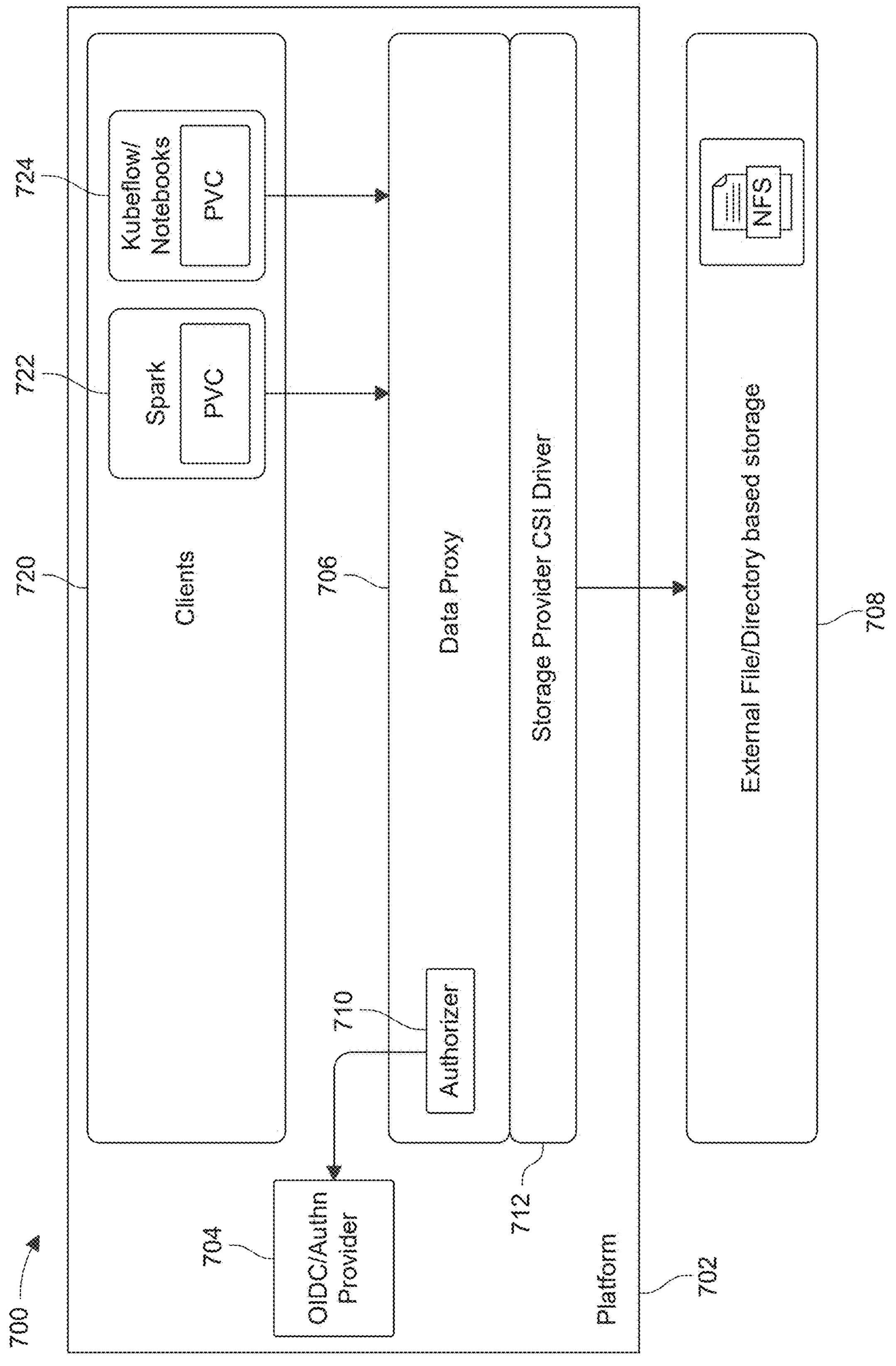
FIG. 7 illustrates accessing a data proxy of an external file/directory based storage implemented at the AI platform, in some examples of the disclosure.

FIG. 7 illustrates accessing a data proxy of an external file/directory based storage implemented at the AI platform, in some examples of the disclosure. In example 700, data proxy 706 provides access to unstructured files/directories 708 (e.g., NFS) after the user has been authenticated to access the particular data. For example, the user may receive the access token from OIDC provider 704 (e.g., based on authentication using login credentials). OIDC provider 704 can provide the access token to data proxy 706 to store locally and compare with an incoming access token at a later time (e.g., when the workload initiates a task/job). Once the token is stored, authorizer 710 at data proxy 706 can authenticate and authorize any data requests associated with the access token based on the policies corresponding to the access token.

In some examples, a secure communication tunnel can be generated between clients 720 and unstructured files/directories 708 through data proxy 706 to initiate the communication between clients 720, data proxy 706, and unstructured files/directories 708. The secure communication tunnel may be a protocol aware tunnel based on the type of data being accessed (e.g., the object data). AI platform 702 may open the tunnel for initiating a session between unstructured files/directories 708 and clients 720. The access token associated with the user may be downloaded and saved to authorizer 710 at data proxy 706.

Clients 720 may comprise various components that are in communication with data proxy 706, including spark 722, Kuberflow™/notebooks 724, and other services that can support data processing and other operations initiated by clients 720. Data proxy 706 may comprise components that receive the request from clients 720, including a storage provider Container Storage Interface (CSI) driver 712. In some examples, the CSI driver 712 allows a separation of between clients 720 and unstructured files/directories 708 and data proxy 706 may communicate with unstructured files/directories 708 via CSI driver 712.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 8:
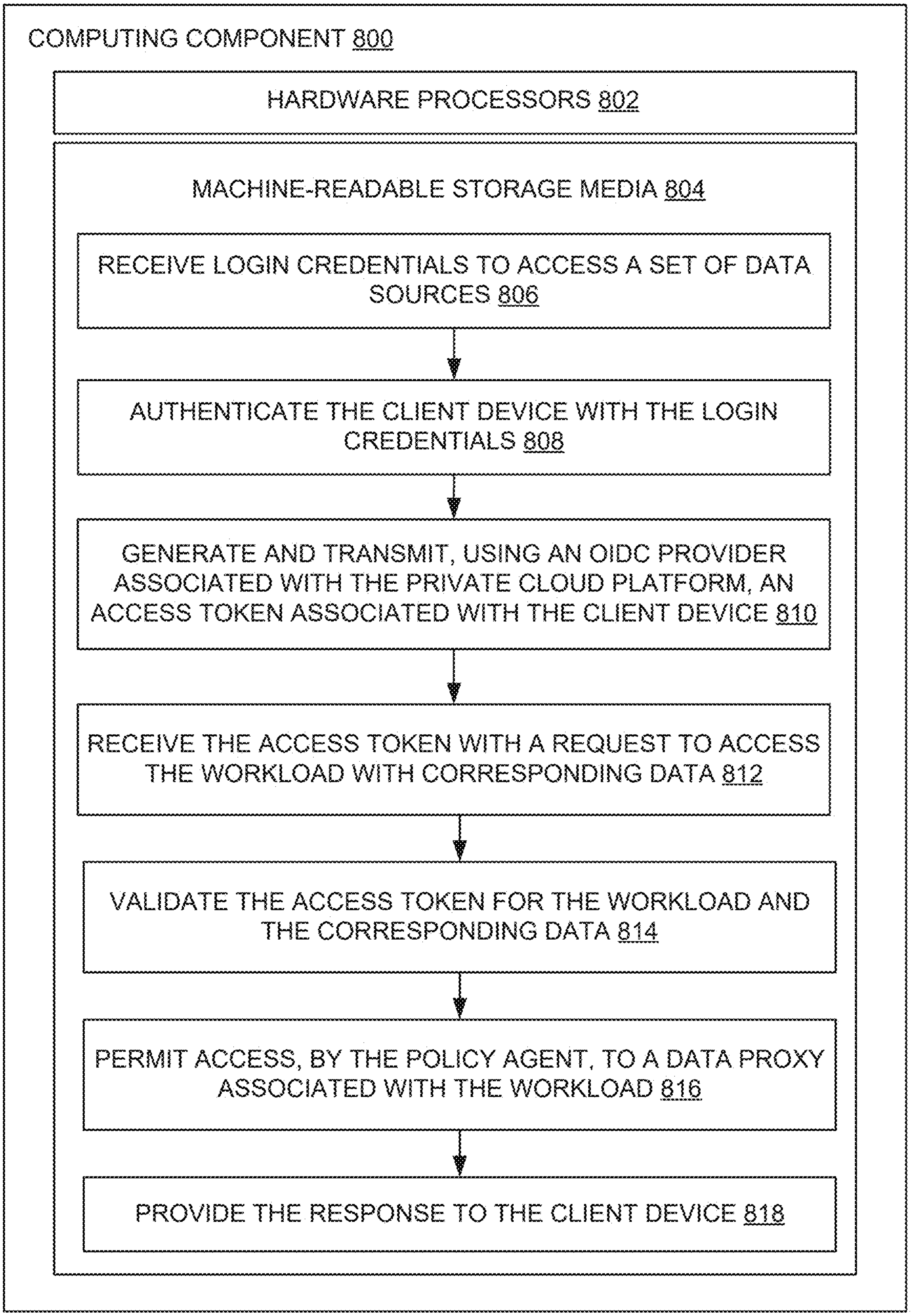
FIG. 8 is an example computing component that may be used to implement various features of the AI platform in accordance with examples discussed herein.

FIG. 8 illustrates a computing component that may be used to implement a lineage-based classification of network events, in accordance with various examples of the disclosed technology. Referring now to FIG. 8, computing component 800 may be, for example, a server computer, a controller, or any other similar computing component capable of processing data. In the example implementation of FIG. 8, the computing component 800 includes hardware processor 802 and machine-readable storage medium 804.

Hardware processor 802 may be one or more central processing units (CPUs), semiconductor-based microprocessors, and/or other hardware devices suitable for retrieval and execution of instructions stored in machine-readable storage medium 804. Hardware processor 802 may fetch, decode, and execute instructions, such as instructions 806-818, to control processes or operations for a lineage-based classification of network events. As an alternative or in addition to retrieving and executing instructions, hardware processor 802 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 804, may be any electronic, magnetic, optical, or other physical storage device that contains or stores executable instructions. Thus, machine-readable storage medium 804 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 804 may be a non-transitory storage medium, where the term "non-transitory" does not encompass transitory propagating signals. As described in detail below, machine-readable storage medium 804 may be encoded with executable instructions, for example, instructions 806-818.

Hardware processor 802 may execute instruction 806 to receive login credentials to access a set of data sources. The login credentials may correspond with a unique identifier (e.g., username and password, biometric data, smart cards, one-time password, security questions and answers, etc.) that allows the user to verify their identity and access the platform. The login credentials may be received from a client device at a private cloud platform.

Hardware processor 802 may execute instruction 808 to authenticate the client device with the login credentials. For example, the login credentials provided by the user may be compared to stored login credentials. When the two sources of login credentials match, the user may be authenticated with the platform. The authentication may be initiated at the private cloud platform.

Hardware processor 802 may execute instruction 810 to generate and transmit, using an OpenID Connect (OIDC) provider associated with the private cloud platform, an access token associated with the client device. In some examples, the access token contains information about the user, such as their identity (like name and email). The access token may also correspond with a policy/access level for user throughout the platform and the policy may be maintained at policy server. In some examples, when user logs into the system, the OIDC provider authenticates the user (e.g., using the login credentials) and generates the access token. The generation and transmission of the access token may be in response to the authentication.

In some examples, OIDC provider may also expose a UserInfo endpoint where client applications can request additional details about the authenticated user. In this example, the platform can rely on the OIDC provider to confirm an identity of the user that can be used to authenticate the user to the platform (e.g., prior to generating and transmitting the access token to the user).

Hardware processor 802 may execute instruction 812 to receive the access token with a request to access the workload with corresponding data. The request may be received from a policy agent associated with a workload of the private cloud platform. In some examples, the user may provide/submit the request to access the data with the access token appended to the request.

Hardware processor 802 may execute instruction 814 to validate the access token for the workload and the corresponding data. The validation may be initiated by the policy agent using policies that are periodically pushed from the policy server. The policy agent may, for example, check the access role identified with the token in a local data store at the agent, confirming that user is allowed to request the workload and access corresponding data. The policy agent can store and serve the policy information for the validation process prior to permitting access to the data/workload.

Hardware processor 802 may execute instruction 816 to permit access, by the policy agent, to a data proxy associated with the workload. The permission to access the data proxy may be in response to the validation. In some examples, the workload accesses the data proxy in generating a response to the request to access the workload. When authorized, the workload executes the task and accesses the data.

In some examples, the data source proxy may be adjusted/managed by administrative users, and these users may access parameters of the data source proxy via an interface. The platform can allow/deny access to data based on the policies defined for each user.

In some examples, the data source proxy may include data that is transmitted from external data sources and stored locally in the platform at one of the data source proxies. In this example, the request for data from workload may access the locally stored data and initiate the workload/job for the user.

Hardware processor 802 may execute instruction 818 to provide the response to the client device. For example, the workload/job may be executed on behalf of the user (e.g., using the data accessed at the data proxy or the external data source) and return a response based on the processing.

Figure 9:
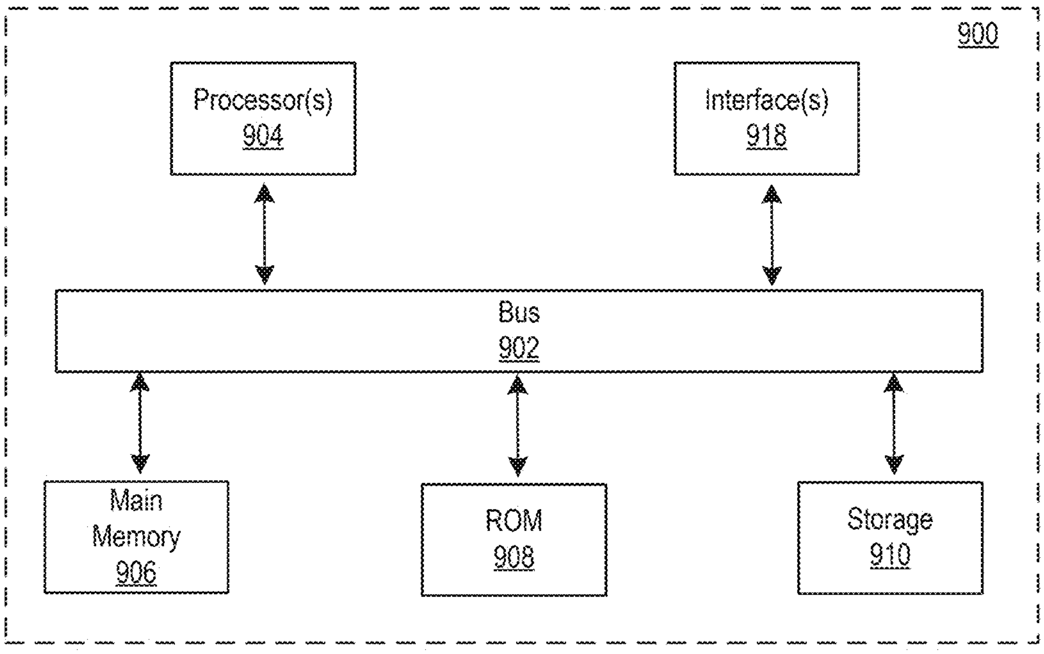
FIG. 9 is a computing component that may be used to implement examples of the disclosed technology.

FIG. 9 depicts a block diagram of an example computer system 900 in which various examples of the disclosed technology described herein may be implemented, including the AI platform with token-based authentication in multi-level data access described herein. Computer system 900 includes bus 902 or other communication mechanism for communicating information, one or more hardware processors 904 coupled with bus 902 for processing information. Hardware processor(s) 904 may be, for example, one or more general purpose microprocessors.

Computer system 900 also includes main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

Computer system 900 further includes read only memory (ROM) 908 or other static storage device coupled to bus 902 for storing static information and instructions for processor 904. Storage device 910, such as a magnetic disk, optical disk, or USB thumb drive (Flash drive), etc., is provided and coupled to bus 902 for storing information and instructions.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

Computer system 900 may implement the techniques described herein using customized hard-wired logic, one or more ASICs or FPGAs, firmware and/or program logic which in combination with the computer system causes or programs computer system 900 to be a special-purpose machine. According to one example of the disclosed technology, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

Computer system 900 also includes interface 918 coupled to bus 902. Interface 918 provides a two-way data communication coupling to one or more network links that are connected to one or more local networks. For example, interface 918 may be an integrated services digital network (ISDN) card, cable modem, satellite modem, or a modem to provide a data communication connection to a corresponding type of telephone line. As another example, interface 918 may be a local area network (LAN) card to provide a data communication connection to a compatible LAN (or WAN component to communicate with a WAN). Wireless links may also be implemented. In any such implementation, interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through interface 918, which carry the digital data to and from computer system 900, are example forms of transmission media.

Computer system 900 can send messages and receive data, including program code, through the network(s), network link and interface 918. In the Internet example, a server might transmit a requested code for an application program through the Internet, the ISP, the local network and interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a “cloud computing” environment or as a “software as a service” (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term “or” may be construed in either an inclusive or exclusive sense. Moreover, the description of resources, operations, or structures in the singular shall not be read to exclude the plural. Conditional language, such as, among others, “can,” “could,” “might,” or “may,” unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as “conventional,” “traditional,” “normal,” “standard,” “known,” and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as “one or more,” “at least,” “but not limited to” or other like phrases in some instances shall not be read to mean that the narrower case is intended or required in instances where such broadening phrases may be absent.

What is claimed is:

1. A computer-implemented method comprising:

receiving, from a client device at a private cloud platform, login credentials to access the private cloud platform;

authenticating, at the private cloud platform, the client device with the login credentials;

in response to the authentication, generating and transmitting, using an OpenID Connect (OIDC) provider associated with the private cloud platform, an access token associated with the client device;

receiving, at a policy agent associated with a workload of the private cloud platform, the access token with a request to access the workload with corresponding data;

validating, by the policy agent, the access token for the workload and the corresponding data by confirming an access role identified by the access token, using policy information pushed from a policy server and stored in a local data store at the policy agent, which allows the client device to request the access to the workload and the corresponding data;

in response to the validation, permitting access, by the policy agent, to a data proxy associated with the workload, wherein the data proxy makes the corresponding data available to the workload from an external data source for generating a response to the request to access the workload; and providing the response to the client device.

2. The computer-implemented method of claim 1, wherein the private cloud platform is located on a private cloud at a customer environment and the client device accesses the private cloud from within the customer environment.

3. The computer-implemented method of claim 1, further comprising:

in response to the data proxy associated with the workload receiving a second request, initiating an authentication process of the client device with the access token;

validating the access token; and initiating an external request for data on behalf of the client device.

4. The computer-implemented method of claim 1, wherein the access token is associated with a data record that is maintained at the policy server, and the data record defines the access role and access level information about a user of the client device.

5. The computer-implemented method of claim 1, wherein the data proxy is managed by an administrative user via a data source management device that provides information related to data sources, and wherein the information comprises credentials, bucket name, folder paths, or database tables.

6. The computer-implemented method of claim 1, wherein the data proxy accesses an Amazon™ S3 data source.

7. The computer-implemented method of claim 1, wherein the data proxy accesses a file-based data system.

8. The computer-implemented method of claim 1, wherein the data proxy accesses a Postgres™ structured database.

9. A private cloud platform comprising:

a memory storing instructions; and a processor communicatively coupled to the memory and configured to execute the instructions to:

receive, from a client device at the private cloud platform, login credentials to access the private cloud platform;

authenticate the client device with the login credentials;

in response to the authentication, generate and transmit, using an OpenID Connect (OIDC) provider, an access token associated with the client device;

receive, at a policy agent, the access token with a request to access a workload with corresponding data;

validate, by the policy agent, the access token for the workload and the corresponding data by confirming an access role identified by the access token, using policy information pushed from a policy server and stored in a local data store at the policy agent, which allows the client device to request the access to the workload and the corresponding data;

in response to the validation, permit access, by the policy agent, to a data proxy associated with the workload, wherein the the data proxy makes the corresponding data available to the workload from an external data source for generating a response to the request to access the workload; and provide the response to the client device.

10. The private cloud platform of claim 9, wherein the private cloud platform is located on a private cloud at a customer environment and the client device accesses the private cloud from within the customer environment.

11. The private cloud platform of claim 9, wherein the processor is further configured to:

in response to the data proxy associated with the workload receiving a second request, initiate an authentication process of the client device with the access token;

validate the access token; and initiate an external request for data on behalf of the client device.

12. The private cloud platform of claim 9, wherein the access token is associated with a data record that is maintained at the policy server, and the data record defines the access role and access level information about a user of the client device.

13. The private cloud platform of claim 9, wherein the data proxy is managed by an administrative user via a data source management device that provides information related to data sources, and wherein the information comprises credentials, bucket name, folder paths, or database tables.

14. The private cloud platform of claim 9, wherein the data proxy accesses an Amazon™ S3 data source.

15. The private cloud platform of claim 9, wherein the data proxy accesses a file-based data system.

16. The private cloud platform of claim 9, wherein the data proxy accesses a Postgres™ structured database.

17. A non-transitory computer-readable storage medium storing a plurality of instructions executable by a processor, the plurality of instructions when executed by the processor cause the processor to:

receive, from a client device, login credentials to access a data platform;

authenticate the client device with the login credentials;

in response to the authentication, generate and transmit, using an OpenID Connect (OIDC) provider, an access token associated with the client device;

receive, at a policy agent, the access token with a request to access a workload with corresponding data;

validate, by the policy agent, the access token for the workload and the corresponding data by confirming an access role identified by the access token, using policy information pushed from a policy server and stored in a local data store at the policy agent, which allows the client device to request the access to the workload and the corresponding data;

in response to the validation, permit access, by the policy agent, to a data proxy associated with the workload, wherein the data proxy makes the corresponding data available to the workload from an external data source for generating a response to the request to access the workload; and provide the response to the client device.

18. The non-transitory computer-readable storage medium of claim 17, wherein the policy agent is located on a private cloud at a customer environment and the client device accesses the private cloud from within the customer environment.

19. The non-transitory computer-readable storage medium of claim 17, further comprising:

in response to the data proxy associated with the workload receiving a second request, initiating an authentication process of the client device with the access token;

validating the access token; and initiating an external request for data on behalf of the client device.

20. The non-transitory computer-readable storage medium of claim 17, wherein the access token is associated with a data record that is maintained at the policy server, and the data record defines the access role and access level information about a user of the client device.

* * * * *